(12) United States Patent
Yuan et al.

(10) Patent No.: US 9,919,548 B1
(45) Date of Patent: Mar. 20, 2018

(54) METHOD OF SLICING AND PRINTING MULTI-COLOUR 3D OBJECT

(71) Applicants: XYZPRINTING, INC., New Taipei (TW); KINPO ELECTRONICS, INC., New Taipei (TW)

(72) Inventors: Kuo-Yen Yuan, New Taipei (TW); Bo-Yi Wu, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/494,204

(22) Filed: Apr. 21, 2017

(30) Foreign Application Priority Data

Jan. 5, 2017 (TW) .............................. 106100346 A

(51) Int. Cl.
*B41J 3/407* (2006.01)
*B41J 29/393* (2006.01)
*B41J 2/01* (2006.01)

(52) U.S. Cl.
CPC .................................. *B41J 29/393* (2013.01)

(58) Field of Classification Search
CPC . B41J 2/01; B41J 29/393; B41J 3/407; B33Y 30/00
See application file for complete search history.

(56) References Cited

U.S. PATENT DOCUMENTS

| 2016/0001549 A1* | 1/2016 | Kubo | B41J 2/04536 |
| | | | 347/9 |
| 2016/0221359 A1* | 8/2016 | Till | B41J 3/4073 |
| 2016/0339724 A1* | 11/2016 | Munenaka | B41J 25/003 |

* cited by examiner

*Primary Examiner* — Jason Uhlenhake
(74) *Attorney, Agent, or Firm* — Chun-Ming Shih; HDLS IPR Services

(57) ABSTRACT

A method of slicing and printing multi-color 3D object is provided. The method includes following steps of: loading a coordinate information and a color information of a multi-color 3D object; executing a slicing process to generate a plurality of object printing slices and a plurality of object images; generating a plurality of pollution-blocking printing slices and making each pollution-blocking printing slice partially overlap an edge of the same-layer object printing slice; controlling a modeling nozzle of a multi-color 3D printer to print the object printing slices layer by layer, printing each pollution-blocking printing slice partially overlapping the same-layer object printing slice after the same-layer object printing slice is printed, and controlling a coloring nozzle of the multi-color 3D printer to color each of printed object printing slice after the same-layer pollution-blocking printing slice is printed.

10 Claims, 11 Drawing Sheets

METHOD OF SLICING AND PRINTING MULTI-COLOUR 3D OBJECT

BACKGROUND OF THE INVENTION

Field of the Invention

The technical field relates to 3D printing, especially to a method of slicing and printing a multi-colour 3D object.

Description of Prior Art

For printing a multi-colour 3D entity model, a multi-colour 3D printer using fused deposition modeling (FDM) has been provided in related art. The aforementioned multi-colour 3D printer also includes a modeling nozzle for 3D printing and a coloring nozzle for coloring.

Please also refer to FIG. 1A to FIG. 1D, FIG. 1A shows a first diagram of a printing of a multi-colour 3D printer of related art, FIG. 1B shows a second diagram of a printing of a multi-colour 3D printer of related art, FIG. 1C shows a third diagram of a printing of a multi-colour 3D printer of related art, FIG. 1D shows a fourth diagram of a printing of a multi-colour 3D printer of related art, for describing the multi-colour 3D printer of related art performing multi-colour 3D printing.

The multi-colour 3D printer starts printing, then controls a modeling nozzle 10 to print a layer of printing slices 140 (as shown in FIG. 1A), and controls a coloring nozzle 12 to jet print colored ink (for example, black) on the printing slices 140 for coloring (as shown in FIG. 1B). Then, the multi-colour 3D printer controls the modeling nozzle 10 to print another layer of printing slices 142 stacked on the colored printing slices 140 (as shown in FIG. 1C), and controls the coloring nozzle 12 to jet print colored ink with different color (for example, blue) on the printing slices 142 for coloring (as shown in FIG. 1D). By repeating the aforementioned printing and coloring, the multi-colour 3D printer can generate a multi-colour 3D entity model.

In the aforementioned print method, because the coloring nozzle 12 cannot accurately control a range of jet printing, if the above printing slices 142 does not completely cover the below printing slices 140 (as shown in FIG. 1C, FIG. 1D), the multi-colour 3D printer coloring the above printing slices 142 often sprays ink to a location outside an intended area (for example, spraying ink to surface of the below printing slices 140), resulting in the printed multi-colour 3D entity model having color-mixing defect, and low printing quality.

SUMMARY OF THE INVENTION

The disclosure is directed to a method of slicing and printing a multi-colour 3D model, the method automatically adds pollution-blocking printing slices for blocking ink spraying to a location outside an intended area during coloring process.

One of the exemplary embodiments, a method of slicing and printing multi-colour 3D object is provided, the method includes: a) loading a 3D data of a multi-colour 3D object and reading a coordinate information and a colour information of the multi-colour 3D object; b) executing a route slicing process according to the coordinate information to generate a plurality of object route data of a plurality of object printing slices, wherein each of the object route data respectively records a layer number; c) executing a image slicing process according to the colour information to generate a plurality of object images of the plurality of object printing slices, wherein each of the object images respectively records the layer number; d) generating a plurality of pollution-blocking route data of a plurality of pollution-blocking printing slices according to the plurality of object route data, and setting each of the pollution-blocking route data to make each of the pollution-blocking printing slices overlap a edge of the object printing slice in a same layer, wherein each of the pollution-blocking route data respectively records the layer number; and e) controlling a modeling nozzle of a multi-colour 3D printer to print the plurality of object printing slices layer by layer according to the object route data, to print the pollution-blocking printing slices partially overlapping on the edge of the object printing slices printed according to the pollution-blocking route data in the same layer, when the object printing slices being printed completely, and controlling a coloring nozzle of the multi-colour 3D printer to color the object printing slices printed according to the object image in the same layer, when the pollution-blocking printing slices being printed completely.

The present disclosure can prevent the ink from spraying to the printed printing slices below to generate color-mixing, thus the printing quality is improved effectively.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1A:
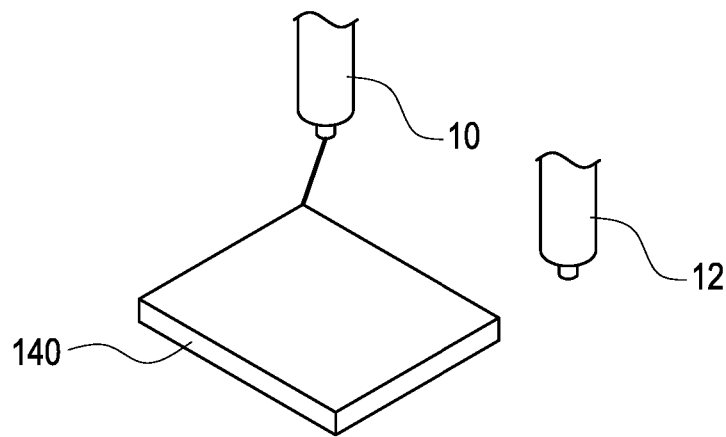
FIG. 1A shows a first diagram of a printing of a multi-colour 3D printer of related art.
Figure 1B:
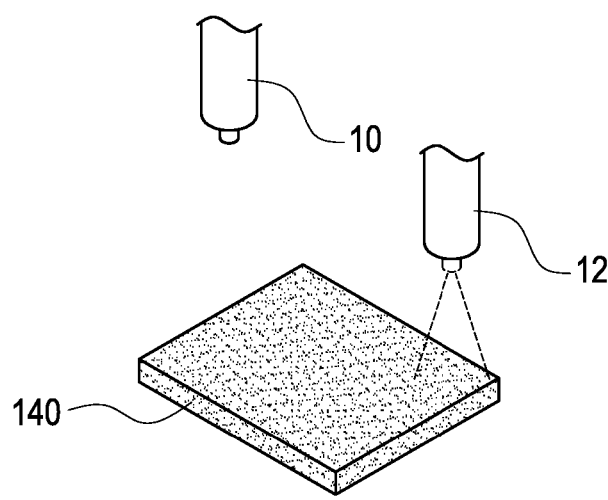
FIG. 1B shows a second diagram of a printing of a multi-colour 3D printer of related art.
Figure 1C:
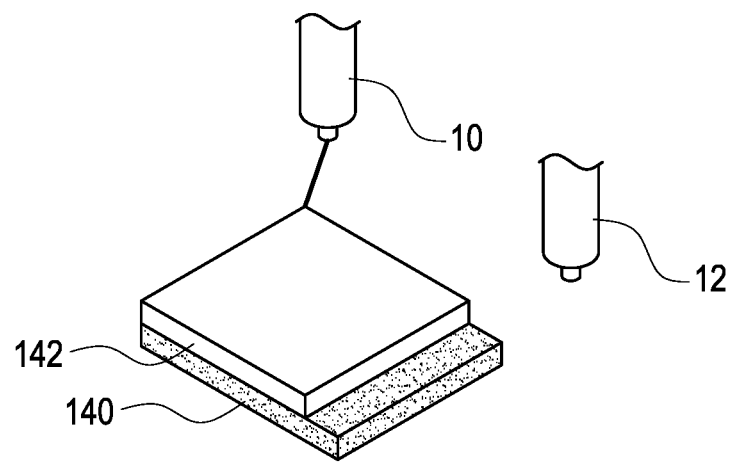
FIG. 1C shows a third diagram of a printing of a multi-colour 3D printer of related art.
Figure 1D:
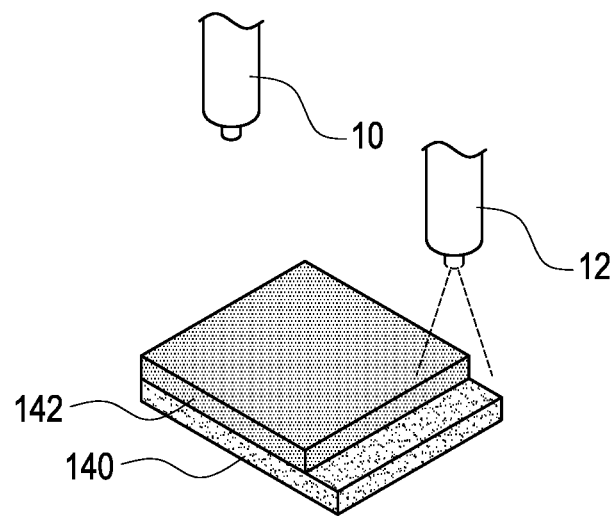
FIG. 1D shows a fourth diagram of a printing of a multi-colour 3D printer of related art.
Figure 2:
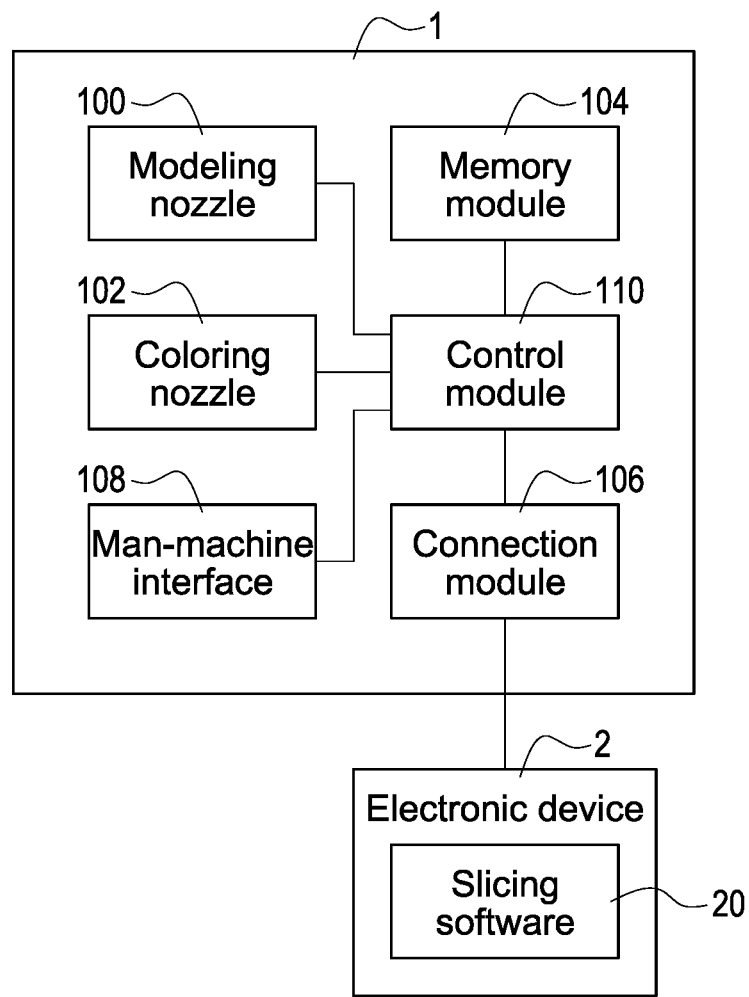
FIG. 2 shows a structural diagram of the multi-colour 3D printer according to a first exemplary embodiment of the present disclosure.

Please refer to FIG. 2 first, FIG. 2 shows a structural diagram of the multi-colour 3D printer according to a first exemplary embodiment of the present disclosure. The exemplary embodiment discloses a 3D printing system; the 3D printing system includes a multi-colour 3D printer 1 and slicing software 20. The electronic device 2 (for example, a desktop computer, a laptop, a cloud server, or a smartphone) executes the slicing software 20, then the slicing software 20 can load the 3D data of the multi-colour 3D object, and can perform slicing to the multi-colour 3D object by modifying the 3D data to generate the 3D print data (that is, the following object route data, pollution-blocking route data or object image, 3D print data can be represented by G-code). The multi-colour 3D printer 1 can perform printing to generate the multi-colour 3D entity model corresponding to the multi-colour 3D object according to the 3D print data.

The multi-colour 3D printer 1 mainly includes a modeling nozzle 100, a coloring nozzle 102, a memory module 104, a connection module 106, a man-machine interface 108 and a control module 110.

The modeling nozzle 100 is connected to supplies provider (not shown), and uses the supplies to perform 3D printing.

In an exemplary embodiment, the multi-colour 3D printer 1 is a fused deposition modeling (FDM) 3D printer, the supplies provider can provide thermoplastic supplies (such as acrylonitrile-butadiene-styrene copolymer (ABS) or polylactic acid (PLA)) to the modeling nozzle 100, the modeling nozzle 100 can heat the supplies to half-molten state to perform 3D printing.

In an exemplary embodiment, the multi-colour 3D printer 1 is a stereo-lithography (SL) 3D printer, the supplies provider can provide liquid UV curable resin to the modeling nozzle 100, the modeling nozzle 100 can jet print UV curable resin and apply light (such as ultraviolet light or laser light) to the jet printed UV curable resin for curing the jet printed UV curable resin to be 3D printed.

The coloring nozzle 102 is connected to ink cartridge (not shown) storing ink. In an exemplary embodiment, the coloring nozzle 102 may include a plurality of sub-nozzles, each sub-nozzle is respectively connected to a plurality of ink cartridges with different colors (such as cyan, magenta, yellow and black), and full-colored printing can be implemented by color-mixing.

The memory module 104 stores data (as the aforementioned 3D print data). The connection module 106 (such as USB module, PCI bus module, Wi-Fi module or Bluetooth module) is connected to the electronic device 2, and receives the 3D print data from the electronic device 2. The man-machine interface 108 (such as button, display, indicating light, buzzer or any combination of above) receives the user operation and outputs the print related information.

The control module 110 can control the modeling nozzle 100 and the coloring nozzle 102 to print according to the 3D print data.

Figure 3:
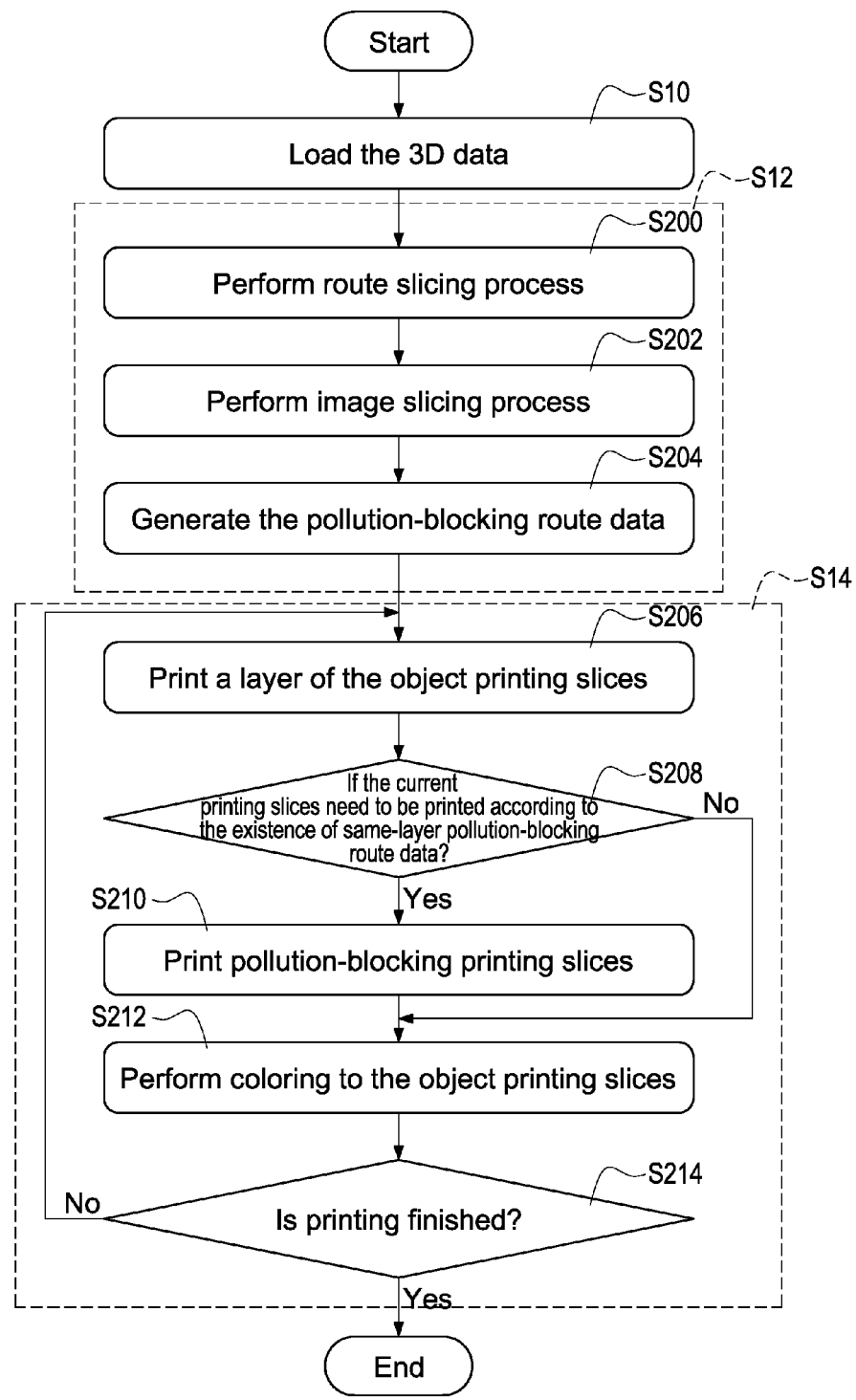
FIG. 3 shows a flowchart of the method of slicing and printing according to the first exemplary embodiment of the present disclosure.

Then please refer to FIG. 3, FIG. 3 shows a flowchart of the method of slicing and printing according to the first exemplary embodiment of the present disclosure. The method of slicing and printing multi-colour 3D object (hereafter slicing and printing method) of each exemplary embodiment of the present disclosure is mainly implemented by the multi-colour 3D printing system shown in FIG. 2.

As the exemplary embodiment shown in FIG. 3, the electronic device 2 or the multi-colour 3D printer 1 executes the slicing software 20 (described later by the electronic device 2 executing the slicing software 20 for example), then controls the electronic device 2 or the multi-colour 3D printer 1 to execute steps S10-S12.

Figure 7A:
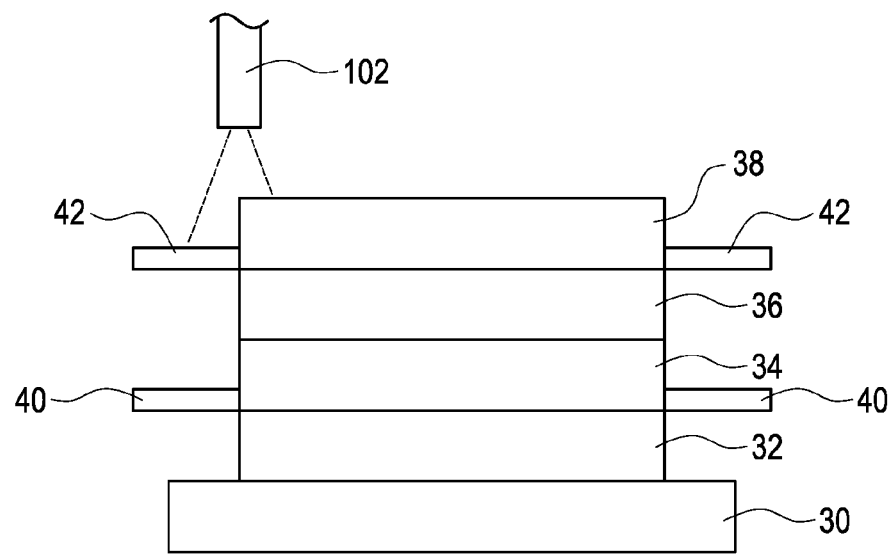
FIG. 7A shows a diagram of a sectional view of an outer pollution-blocking printing slice.

Step S10: the electronic device 2 loads the 3D data of the multi-colour 3D object (such as the multi-colour 3D object 22 shown in FIG. 7A). Specifically, the 3D data is, for example but not limited to, OBJ file or PLY file or other types of 3D file compiled by the user. Besides, the 3D data records the multi-colour 3D object to be printed by the user. The electronic device 2 loads the 3D data, then reads the coordinate information and colour information of the multi-colour 3D object.

In an exemplary embodiment, the coordinate information includes the coordinate of each point of the multi-colour 3D object on X axis, Y axis and Z axis of the multi-colour 3D printer 1, and the colour information includes the color level of each point of the multi-colour 3D object, in particular color space (such as RGB color space).

Step S12: the electronic device 2 executes slicing process to the loaded 3D data, and transmits the 3D print data generated by the slicing process to the multi-colour 3D printer 1 for 3D printing.

In an exemplary embodiment, step S12 includes the following steps.

Step S200: the electronic device 2 performs a route slicing process to a body of the multi-colour 3D object to generate a plurality of object route data of a plurality of object printing slices.

In an exemplary embodiment, the electronic device 2 reads the plurality of coordinates in the coordinate information, the aforementioned plurality of coordinates describes a shape structure of the multi-colour 3D object. Then, the electronic device 2 executes the route slicing process, according to predetermined slicing layer thickness or number of slicing layers, to generate the plurality of object route data of the plurality of object printing slices, wherein the multi-colour 3D object is formed by stacking the plurality of object printing slices.

In an exemplary embodiment, each object route data includes the plurality of coordinates. Besides, a number of the plurality of object route data equals to the number of slicing layers. For example, if the multi-colour 3D object can be sliced into one hundred layers of object printing slices, then one hundred of object route data will be generated after the route slicing process. One hundred of object route data respectively corresponds to one hundred of object printing slices, and respectively describes printing route of the corresponding object printing slices.

Step S202: the electronic device 2 performs image slicing process to the image of the multi-colour 3D object to generate the plurality of object images of the plurality of object printing slices.

Step S204: the electronic device 2 generates the pollution-blocking route data of the pollution-blocking printing slices. Specifically, the electronic device 2 generates the plurality of pollution-blocking route data of the plurality of pollution-blocking printing slices according to the plurality of object route data. Besides, electronic device 2 can set each pollution-blocking route data to make edge of each pollution-blocking printing slice overlap with edge of same-layer object printing slice. The aforementioned pollution-blocking printing slices can be, for example but not limited to, outer pollution-blocking printing slices surrounding outer edge of object printing slices (as outer pollution-blocking printing slices 40, 42 shown in FIG. 7A, 7B) or inner pollution-blocking printing slices surrounding inner edge of object printing slices (such as inner pollution-blocking printing slices 80, 82 shown in FIG. 9A, 9B).

Figure 7B:
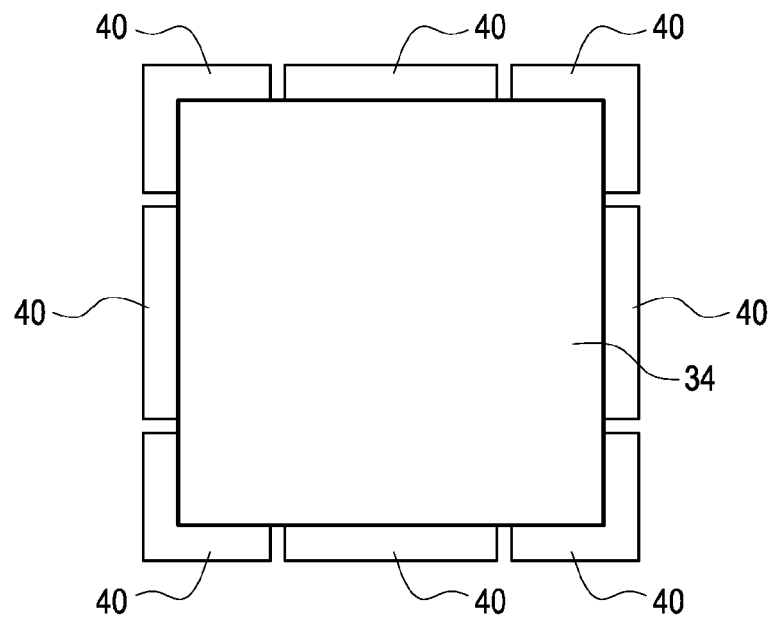
FIG. 7B shows a diagram of a top view of the outer pollution-blocking printing slices.

Please refer to both FIG. 7A and FIG. 7B, FIG. 7A shows a diagram of a sectional view of an outer pollution-blocking printing slices, FIG. 7B shows a diagram of a top view of the outer pollution-blocking printing slices, for describing how the outer pollution-blocking printing slices is added.

As shown in FIG. 7A, in this example, the multi-colour 3D object treated by the route slicing process can be sliced into the plurality of object printing slices 30-38. Besides, the boundary of the object printing slices 30 below exceeds the boundary of the object printing slices 32-38 above, when the coloring nozzle 102 performs coloring to the object printing slices 32-38 above, ink may spray to surface of the object printing slices 30 below to pollute.

Accordingly, the present disclosure generates and sets at least a set of pollution-blocking route data to add outer pollution-blocking printing slices 40-42 to all or part of outer edge of the object printing slices 32-38 above (the example in FIG. 7A is adding the pollution-blocking printing slices to the object printing slices 34, 38). In this way, the added outer pollution-blocking printing slices 40-42 can block the ink spraying to the object printing slices 30 below.

As shown in FIG. 7B, the added outer pollution-blocking printing slices 40-42 does not collapse during printing, because the present disclosure sets the pollution-blocking route data, to make outer pollution-blocking printing slices 40 partly overlap the object printing slices for the outer pollution-blocking printing slices 40 obtaining enough support force preventing collapse by adhering the object printing slices 34.

Besides, the added outer pollution-blocking printing slices 40-42 does not collapse during printing, because the present disclosure sets the pollution-blocking route data to make the outer pollution-blocking printing slices 40 be sliced into the plurality of sub-pollution-blocking printing slices (such as each block of the outer pollution-blocking printing slices 40 shown in FIG. 7B) for achieving uniform weight distribution. Besides, the present disclosure sets the pollution-blocking route data to set clearance between each two adjacent sub-pollution-blocking printing slices. In this way, the user can rapidly remove the plurality of sub-pollution-blocking printing slices with the aid of clearance after printing.

Figure 8:
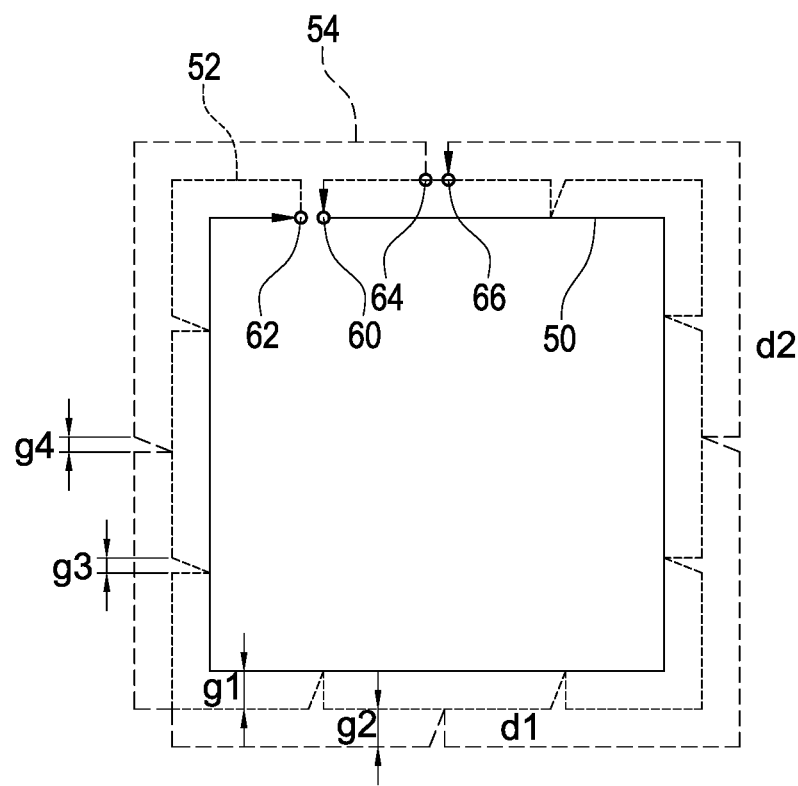
FIG. 8 shows a diagram of a printing route.

Please refer to FIG. 8, FIG. 8 shows a diagram of a printing route. In the aforementioned step S200, the electronic device 2 can generate the object route data of the object printing slices 34, the aforementioned object route data is used for describing the printing route 50 from position 60 to position 62. Specifically, the modeling nozzle 100 performs printing along the printing route 50 and then generates the entity model corresponding to object printing slices 34 during printing.

Besides, the electronic device 2 in the aforementioned step S204 can generate the pollution-blocking route data of the outer pollution-blocking printing slices 40, the aforementioned pollution-blocking route data is used for describing the printing route 52 from position 62 to position 60. Specifically, the modeling nozzle 100 performs printing along the printing route 52, and generates the entity model corresponding to the outer pollution-blocking printing slices 40 during printing.

Further, an end point of the printing route 50 is a start point of the printing route 52 (position 62), in this way, a moving distance of the modeling nozzle 100 is reduced and a printing speed is increased.

In an exemplary embodiment, the printing route 52 overlaps the printing route 50 at an interval of at least predetermined distance d1, to give enough support force to the outer pollution-blocking printing slices 40 during printing by adhering the object printing slices 34 several times, a size of the predetermined distance d1 can be set according to adhesion of the used supplies. Besides, the widest spacing between the printing route 52 and the printing route 50 is a predetermined spacing g1, the predetermined spacing g1 can be determined according to print environment (such as direction and intensity of airflow, print aperture of the multi-colour 3D printer 1 or adhesion of the supplies).

In an exemplary embodiment, if the printing route 52 overlaps the printing route 50, an approaching point thereof and a returning point thereof do not overlap, but are separated by a predetermined clearance g3. In this way, the modeling nozzle 100 printing along printing route 52 can generate the entity model of the outer pollution-blocking printing slices 40 formed by the plurality of sub-pollution-blocking printing slices. Besides, the predetermined clearance g3 is formed between each two adjacent sub-pollution-blocking printing slices, such that the user may rapidly remove the printed sub-pollution-blocking printing slices after printing. Besides, the approaching point does not overlap the returning point, thus both of two ends of each printed sub-pollution-blocking printing slices may generate independent support beam (that is, adjacent sub-pollution-blocking printing slices do not share the same support beam), then the support force obtained is larger.

Figure 9A:
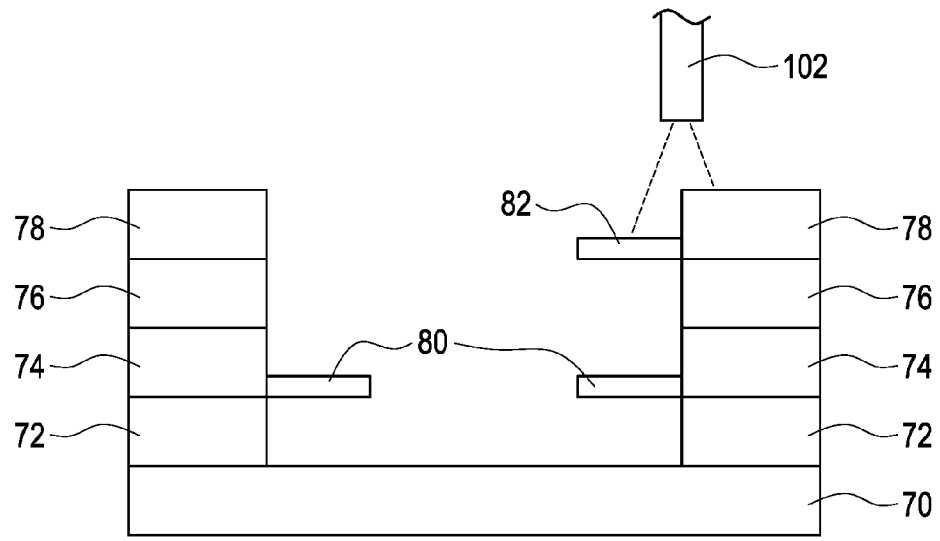
FIG. 9A shows a diagram of a sectional view of inner pollution-blocking printing slices.
Figure 9B:
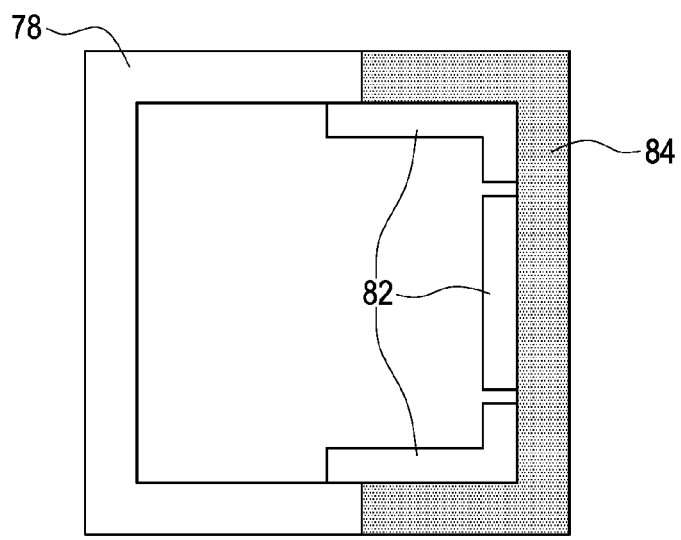
FIG. 9B shows a diagram of a top view of inner pollution-blocking printing slices.

Please also refer to FIG. 9A and FIG. 9B, FIG. 9A shows a diagram of a sectional view of inner pollution-blocking printing slices, FIG. 9B shows a diagram of a top view of inner pollution-blocking printing slices, for describing how the inner pollution-blocking printing slices are added.

As shown in FIG. 9A, in this example, the multi-colour 3D object has an open shell (that is, the inner space and outer space of the multi-colour 3D object are connected, and the inner space can be seen). The multi-colour 3D object treated by the route slicing process can be sliced into the plurality of object printing slices 70-78. Besides, the boundary of the object printing slices 70 below exceeds the boundary of the object printing slices 72-78 above, when the coloring nozzle 102 performs coloring to the object printing slices 72-78 above, ink may spray to surface of the object printing slices 70 below to pollute.

Accordingly, the present disclosure generates and sets at least a set of pollution-blocking route data to add inner pollution-blocking printing slices 80-82 to all or part of outer edge of the object printing slices 72-78 above (the example in FIG. 9A is adding the pollution-blocking printing slices to the object printing slices 74, 78). In this way, the added inner pollution-blocking printing slices 80-82 can block the ink spraying to the object printing slices 70 below.

In an exemplary embodiment, the present disclosure also can determine if the inner pollution-blocking printing slices are added according to the position of the coloring area. As shown in FIG. 9B, the electronic device 2 can recognize the position and/or range of the coloring area 84 of the object printing slices 78 according to same-layer object image first, then determine, according to the position and/or range of the recognized coloring area 84, if the inner pollution-blocking printing slices and position of the inner pollution-blocking printing slices are added (as shown in FIG. 9B, the inner pollution-blocking printing slices 82 are added to the position surrounding the inner edge of the coloring area 84).

Besides, similar to the case of the added outer pollution-blocking printing slices, the electronic device 2 also sets the pollution-blocking route data to make the inner pollution-blocking printing slices 82 overlap the object printing slices 84 to make the inner pollution-blocking printing slices 82 obtain enough support force preventing collapsing by adhering the object printing slices 84. The electronic device 2 also can set the pollution-blocking route data to slice the inner pollution-blocking printing slices 82 into a plurality of sub-pollution-blocking printing slices (as each block shown in the inner pollution-blocking printing slices 82 shown in FIG. 9B), and there is clearance set between each two sub-pollution-blocking printing slices. In this way, the user can rapidly remove the plurality of sub-pollution-blocking printing slices by the clearance after printing.

In an exemplary embodiment, each object route data, each object image and each pollution-blocking route data also respectively records a layer number, the layer number is used to describe the layer number of the printing slices corresponding to each object route data, each object image and each pollution-blocking route data. For example, the layer number of the first layer corresponding to object route data/object image/pollution-blocking route data is "1", the layer number of the tenth layer corresponding to object route data/object image/pollution-blocking route data is "10", the layer number of the 100th layer corresponding to object route data/object image/pollution-blocking route data is "100", and so on.

In an exemplary embodiment, a total number of the object route data, a total number of the object images and a total number of the printing slices are the same, a total number of the pollution-blocking route data is not larger than that of the object route data.

Please refer to FIG. 3 again, step S14 is executed in the following: the multi-colour 3D printer 1 performs 3D printing layer by layer to generate the multi-colour 3D entity model according to the 3D print data generated from the slicing process.

In an exemplary embodiment, step S14 includes the following steps.

Step S206: the control module 110 of the multi-colour 3D printer 1 reads the first layer route, and controls the modeling nozzle 100 to print the first layer of the object printing slices according to the first layer route read.

In an exemplary embodiment, the control module 110 controls the modeling nozzle 100 to print a layer of the object printing slices along the printing route described by the object route data, that is, the control modeling nozzle 100 moves among the plurality of coordinates included in the printing route when printing.

In an exemplary embodiment, the control module 110 executes scrap back pumping when the object printing slices are printed completely, to prevent the scrap on the modeling nozzle 100 from adhering the printed object printing slices and reducing the printing quality.

Step S208: the control module 110 determines if the current printing slices need to be printed according to the existence of same-layer pollution-blocking route data after the object printing slices are printed.

If the control module 110 determines that the current printing slices need to be printed, then step S210 is executed. Otherwise, the control module 110 executes step S212.

Step S210: the control module 110 reads the same-layer pollution-blocking route data, and prints pollution-blocking printing slices on the edge of the printed object printing slices according to the same-layer pollution-blocking route data. The printed pollution-blocking printing slices surround and partly overlap the printed object printing slices.

In an exemplary embodiment, the control module 110 controls the modeling nozzle 100 to print a layer of the pollution-blocking printing slices along the printing route described by the pollution-blocking route data, that is, the control modeling nozzle 100 moves among the plurality of coordinates included by the printing route when printing.

In an exemplary embodiment, the control module 110 executes scrap back pumping when the pollution-blocking printing slices are printed completely, to prevent the scrap on the modeling nozzle 100 from adhering the printed object printing slices and reducing the printing quality.

Step S212: the control module 110 controls the coloring nozzle 102 according to a same-layer (having a same layer number) object image to perform coloring to the first layer of the object printing slices printed, in this way, a layer of the object printing slices are printed and colored completely.

It needs to be noted that during the jet printing the ink, spraying from the coloring nozzle 102 to a location outside the intended area, is blocked by the pollution-blocking jet printing layer printed in advance, thus the ink will not spray to the object printing slices below, and will not pollute the object printing slices below.

In an exemplary embodiment, each object route data includes the plurality of coordinates, the same-layer object image records the plurality of color levels respectively corresponding to the plurality of coordinates. The control module 110 controls the coloring nozzle 102 to jet print ink points to positions of the corresponding coordinates on the printed printing slices according to each color level.

In an exemplary embodiment, the control module 110 reads same-layer the object image at the same layer of the object route data read in step S208, and determines if the corresponding object printing slices need coloring according to the read object image, and controls the coloring nozzle 102 to perform coloring to the printed object printing slices only when coloring is determined to be needed.

Step S214: the multi-colour 3D printer 1 determines if all object printing slices are all printed and colored, that is, the multi-colour 3D entity model has been totally generated. The multi-colour 3D printer 1 stops printing when determining printing is completed, and executes step S206 again to continue printing next layer of the object printing slices when determining printing is not completed.

The present disclosure can effectively avoid the ink spraying to the printed object printing slices below and avoid the resulted-in color-mixing, thus effectively improving the printing quality.

Figure 4:
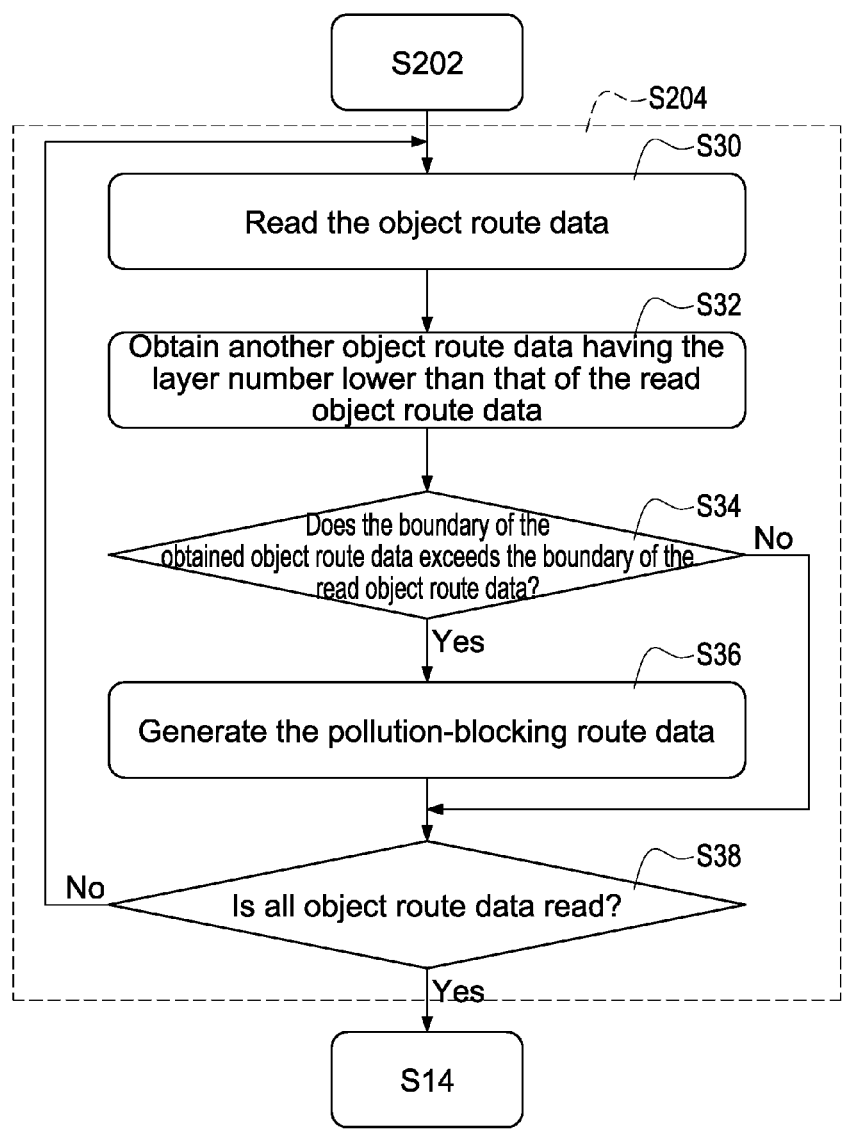
FIG. 4 shows a partial flowchart of the method of slicing and printing according to a second exemplary embodiment of the present disclosure.

Next, please refer to FIG. 3 and FIG. 4, FIG. 4 shows a partial flowchart of the method of slicing and printing according to a second exemplary embodiment of the present disclosure. Compared with the exemplary embodiment shown in FIG. 3, the exemplary embodiment shown in FIG. 4, step S204 of the method of slicing and printing includes the following steps.

Step S30: the electronic device 2 starts reading the object route data from the first layer.

Step S32: the electronic device 2 obtains another object route data having the layer number lower than that of the read object route data.

For example, if the electronic device 2 reads the tenth layer object route data in step S30, then the electronic device 2 obtains one or more layer object route data having the layer number less than 10 in step S32 (for example, obtaining the ninth layer object route data or the first layer to the ninth layer object route data).

In an exemplary embodiment, the difference between the layer number of each object route data obtained by the electronic device 2 in step S32 and the layer number of the read object route data in step S30 is not larger than the predetermined checking layer number.

For the example with the checking layer number being 5, when the electronic device 2 reads the tenth layer object route data, the fifth layer to the ninth layer object route data is also obtained, when the electronic device 2 reads the fifteenth layer object route data, the tenth layer to the fourteenth layer object route data is also obtained.

Step S34: the electronic device 2 determines if the boundary of the obtained object route data in step S32 exceeds the boundary of the read object route data in step S30, that is, determining if the currently read object printing slices can completely cover other object printing slices below.

Further, if the object printing slices can completely cover other object printing slices below, then the ink spraying to a location outside the intended area when coloring will not pollute other object printing slices below, vice versa.

If the electronic device 2 determines that the boundary of any obtained object route data in step S32 exceeds that of the read object route data in step S30, then step S36 is executed. Otherwise, step S38 is executed.

Step S36: the electronic device 2 generates the pollution-blocking route data of the pollution-blocking printing slices and sets the pollution-blocking route data to make the pollution-blocking printing slices surround the coloring area of the same-layer object printing slices and partly overlap the same-layer object printing slices.

Step S38: the electronic device 2 determines if all object route data read. If the electronic device 2 determines that all object route data has been read, then step S14 is executed. Otherwise, the electronic device 2 executes step S30 again.

Figure 5:
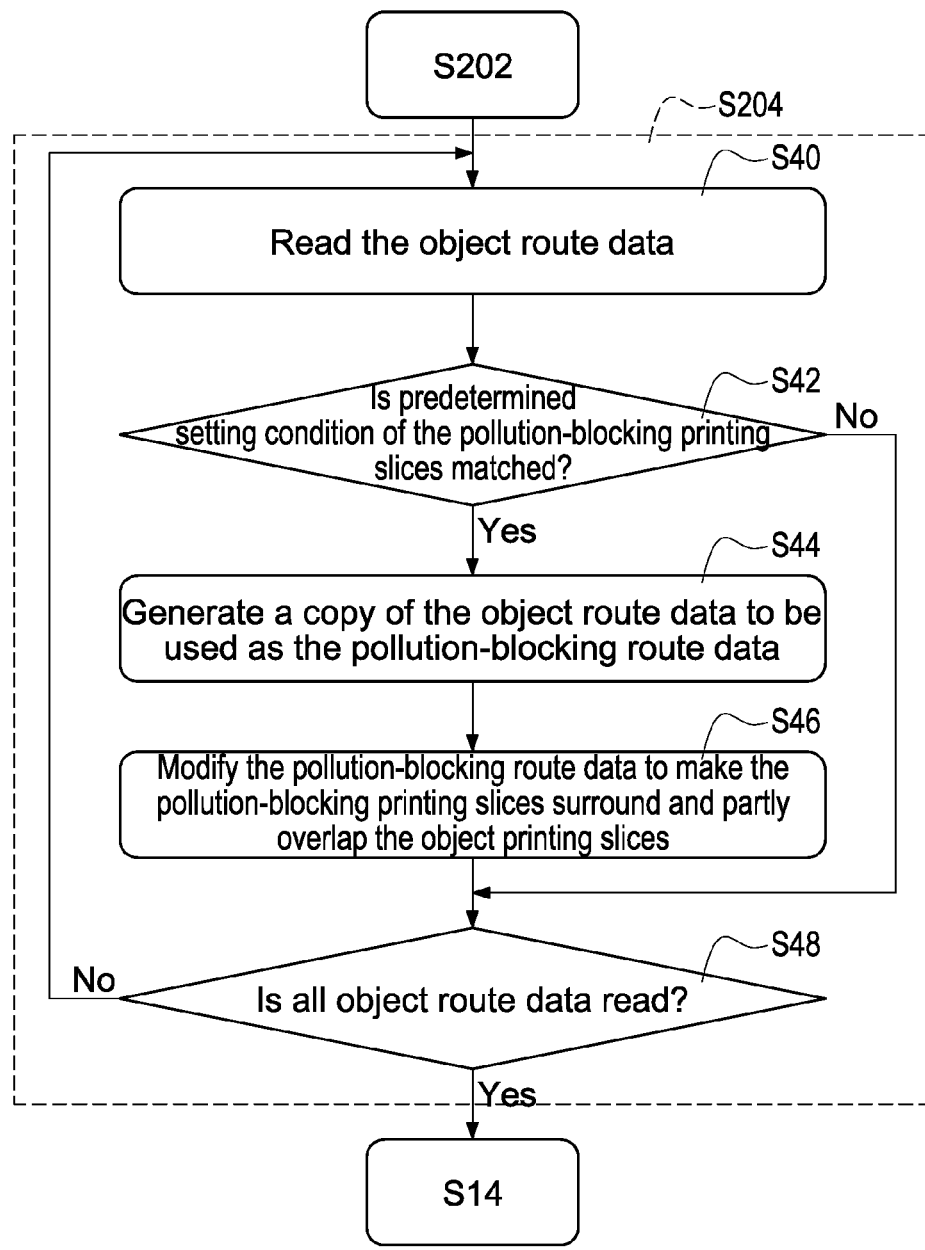
FIG. 5 shows a partial flowchart of the method of slicing and printing according to a third exemplary embodiment of the present disclosure.

Next please refer to FIG. 3 and FIG. 5, FIG. 5 shows a partial flowchart of the method of slicing and printing according to a third exemplary embodiment of the present disclosure. Compared to the exemplary embodiment shown in FIG. 3, step S204 of the method of slicing and printing shown in FIG. 5 includes the following steps.

Step S40: the electronic device 2 starts reading the object route data from the first layer.

Step S42: the electronic device 2 determines if the read object route data matches the predetermined setting condition of the pollution-blocking printing slices.

In an exemplary embodiment, the electronic device 2 executes step S44 when the layer number of the read object route data matches the layer number set or multiples thereof (that is, the setting condition of the pollution-blocking printing slices), to generate the pollution-blocking route data.

For example, if the layer number set is 3 and multiples of 3, then the electronic device 2 executes step S44 when the layer number of the read object route data is 3, 6, 9, 12 . . . , to automatically generate the pollution-blocking route data. If the layer number set is 5 and multiples of 5, then the electronic device 2 executes step S44 when the layer number of the read object route data is 5, 10, 15, 20 . . . , to automatically generate the pollution-blocking route data.

In an exemplary embodiment, the electronic device 2 reads the same-layer object image, and executes step S44 when determining that the same-layer object printing slices includes the coloring area (that is, the setting condition of the pollution-blocking printing slices) according to the object image, to automatically generate the pollution-blocking route data.

If the electronic device 2 determines that the predetermined condition requiring pollution-blocking is matched, then step S44 is executed. Otherwise, the electronic device 2 executes step S48.

Step S44: the electronic device 2 generates a copy of the object route data to be used as the pollution-blocking route data.

Step S46: the electronic device 2 modifies the pollution-blocking route data to make the pollution-blocking printing slices surround and partly overlap the object printing slices.

In an exemplary embodiment, the electronic device 2 modifies the pollution-blocking route data to make the pollution-blocking printing slices surround the same-layer object printing slices according to the predetermined spacing (as the predetermined spacing g1 shown in FIG. 8).

For example, the electronic device 2 extends the aforementioned predetermined spacing of the printing route corresponding to the pollution-blocking route data, when the outer pollution-blocking printing slices (as shown in FIG. 7A, 7B) are to be added, to make the printing route of the modified pollution-blocking route data surround the printing route of the object route data. The electronic device 2 shrinks the aforementioned predetermined spacing of the printing route corresponding to the pollution-blocking route data, when the inner pollution-blocking printing slices (as shown in FIG. 9A, 9B) are to be added, to make the printing route of the object route data surround the printing route of the modified pollution-blocking route data.

In an exemplary embodiment, the electronic device 2 modifies the pollution-blocking route data according to the predetermined distance (such as the predetermined distance d1 shown in FIG. 8), to make the corresponding pollution-blocking printing slices overlap the edge of the object printing slices at an interval of at least predetermined distance. In this way, the printed pollution-blocking printing slices can obtain enough support force by adhering the surrounded object printing slices several times.

In this way, the present disclosure can rapidly generate the pollution-blocking route data.

Step S48: the electronic device 2 determines if all the object route data has been read. If the electronic device 2 determines all object route data has been read, then step S14 is executed. Otherwise, the electronic device 2 executes step S40 again.

Figure 6:
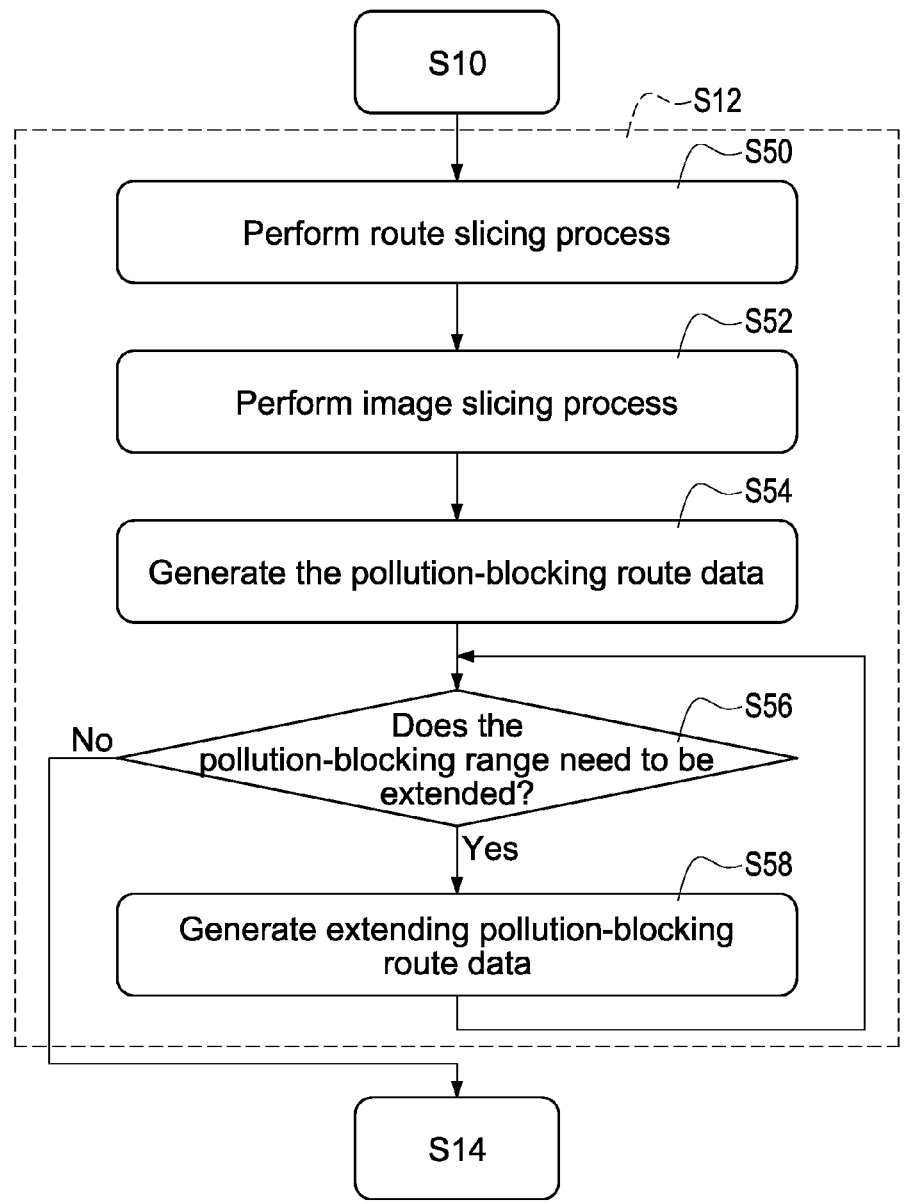
FIG. 6 shows a partial flowchart of the method of slicing and printing according to a fourth exemplary embodiment of the present disclosure.
Figure 10A:
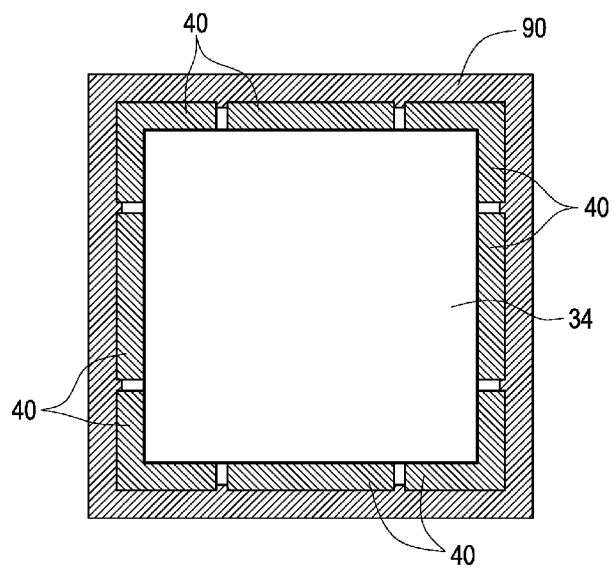
FIG. 10A shows a diagram of a top view of extending pollution-blocking printing slices according to an exemplary embodiment.
Figure 10B:
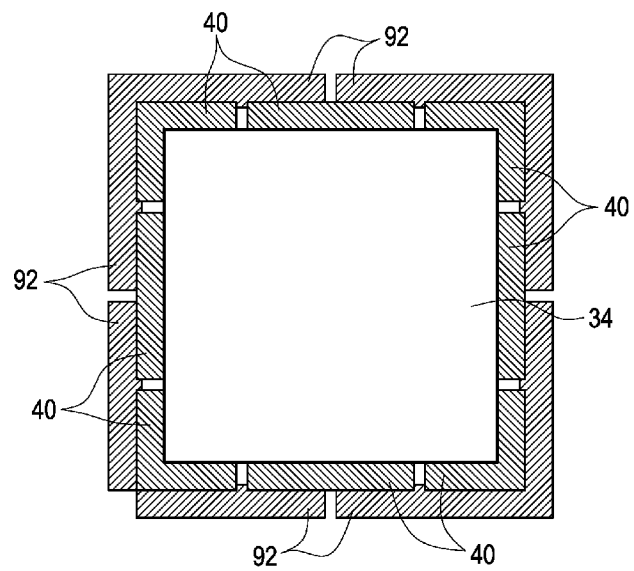
FIG. 10B shows a diagram of a top view of extending pollution-blocking printing slices according to another exemplary embodiment.

Then please refer to FIG. 3, FIG. 6, FIG. 8, FIG. 10A and FIG. 10B together, FIG. 6 shows a partial flowchart of the method of slicing and printing according to a fourth exemplary embodiment of the present disclosure, FIG. 10A shows a diagram of a top view of extending pollution-blocking printing slices according to an exemplary embodiment, FIG. 10B shows a diagram of a top view of extending pollution-blocking printing slices according to another exemplary embodiment. The exemplary embodiment extends the pollution-blocking range to reduce the probability of polluting the object printing slices below, by generating the pollution-blocking route data (hereafter extending pollution-blocking route data) of the second, third, . . . extending pollution-blocking printing slice (hereafter extending pollution-blocking printing slices) in the same printing slice.

Compared to the exemplary embodiment shown in FIG. 3, step S12 of the method of slicing and printing of the exemplary embodiment shown in FIG. 6 includes step S50-S58. Besides, steps S50-S54 are the same as or similar to steps S200-S204 shown in FIG. 3 respectively, detailed description is not repeated here.

Step S56: the electronic device 2 determines if the pollution-blocking range needs to be extended. Specifically, the electronic device 2 determines if the number of the currently generated same-layer extending pollution-blocking route data matches that set by the user in advance (for example, two sets).

If the electronic device 2 determines the pollution-blocking range needs to be extended, then step S58 is executed. Otherwise, step S14 is executed.

Step S58: the electronic device 2 generates the plurality of extending pollution-blocking route data of the plurality of extending pollution-blocking printing slices, and sets each of the extending pollution-blocking route data to make each of the extending pollution-blocking printing slices surround and partly overlap a previous set of the same-layer pollution-blocking printing slices, wherein each extending pollution-blocking route data also respectively records the layer number.

For example, as shown in FIG. 10A, the electronic device 2 generates the pollution-blocking route data of the outer pollution-blocking printing slices 40, and then further generates the extending pollution-blocking route data of the extending pollution-blocking printing slices 90, and sets the extending pollution-blocking route data to make the extending pollution-blocking printing slices 90 surround and partly overlap the outer pollution-blocking printing slices 40. Because the extending pollution-blocking printing slices 90 have overlapped the outer edge of the outer pollution-blocking printing slices 40, even the extending pollution-blocking printing slices 90 do not adhere to the object printing slices 34, enough support force still can be obtained by the outer pollution-blocking printing slices 40.

In another example, as shown in FIG. 10B, the extending pollution-blocking printing slices 92 generated by the electronic device 2 surround and overlap the outer edge of the outer pollution-blocking printing slices 40, and further are sliced into the plurality of sub-pollution-blocking printing slices (each block of the extending pollution-blocking printing slices 92 shown in FIG. 10B), and there is clearance set between each two adjacent sub-pollution-blocking printing slices. In this way, the user can rapidly remove the plurality of sub-pollution-blocking printing slices by the clearance after printing.

Please also refer to FIG. 8; the extending pollution-blocking route data of the aforementioned extending pollution-blocking printing slices 92 describes the printing route 54 from position 64 to position 66. Specifically, during printing, the modeling nozzle 100 performs printing along the printing route 54, and then generates the entity model corresponding to the extending pollution-blocking printing slices 92.

In an exemplary embodiment, the printing route 54 overlaps the printing route 52 at an interval of at least predetermined distance d2, to make the extending pollution-blocking printing slices 92 obtain enough support force by adhering the outer pollution-blocking printing slices 40 several times during printing, the size of the predetermined distance d2 can be set according to the adhesion of the used supplies.

Besides, the largest spacing between the printing route 54 and the printing route 52 is the predetermined spacing g2; the predetermined spacing g2 is set according to the print environment (such as the direction and intensity of airflow, the aperture of printing, or adhesion of the supplies of the multi-colour 3D printer 1). Further, the extending pollution-blocking printing slices 92 does not directly adhere to the object printing slices 34, thus the support force may be not enough, the aforementioned predetermined spacing g2 is preferably smaller than the predetermined spacing g1 accordingly, to increase the support force by extending the adhesion area.

In an exemplary embodiment, the printing route 54 overlaps the printing route 52, the approaching point does not overlap the returning point, there is a predetermined clearance g4 therebetween (the predetermined clearance g4 and the predetermined clearance g3 are the same or different). In this way, the modeling nozzle 100 prints along printing route 54, and generates the entity model of the extending pollution-blocking printing slices 92 formed by the plurality of sub-pollution-blocking printing slices. Besides, the predetermined clearance g4 is between each two adjacent sub-pollution-blocking printing slices, for the user rapidly removing the printed sub-pollution-blocking printing slices after printing. Besides, the approaching point does not overlap the returning point, both of two ends of each of the printed sub-pollution-blocking printing slices generate independent support beams, thus the support force obtained is enough.

Then, the electronic device 2 executes step S56 again to further determine if the pollution-blocking range needs to be extended.

In this way, the present disclosure can effectively extend the pollution-blocking range, and the printing fail can be effectively prevented.

Thus, particular embodiments have been described. Other embodiments are within the scope of the following claims. For example, the actions recited in the claims may be performed in a different order and still achieve desirable results.

What is claimed is:
1. A method of slicing and printing multi-colour 3D object, the method comprising:
  a) loading a 3D data of a multi-colour 3D object and reading coordinate information and a colour information of the multi-colour 3D object;
  b) executing a route slicing process according to the coordinate information to generate a plurality of object route data of a plurality of object printing slices, wherein each of the object route data records a layer number;
  c) executing an image slicing process according to the colour information to generate a plurality of object images of the plurality of object printing slices, wherein each of the object images records the layer number;
  d) generating a plurality of pollution-blocking route data of a plurality of pollution-blocking printing slices according to the plurality of object route data, and setting each of the pollution-blocking route data to make each of the pollution-blocking printing slices overlap an edge of the object printing slice in a same layer, wherein each of the pollution-blocking route data records the layer number; and
  e) controlling a modeling nozzle of a multi-colour 3D printer to print the plurality of object printing slices layer by layer according to the object route data, to print the pollution-blocking printing slices partially overlapping on the edge of the object printing slices printed according to the pollution-blocking route data in the same layer when the object printing slices being printed completely, and controlling a coloring nozzle of the multi-colour 3D printer to color the object printing slices printed according to the object image in the same layer when the pollution-blocking printing slices being printed completely.

2. The method of slicing and printing multi-colour 3D object of claim 1, wherein step d comprises:
- d1) reading each of the object route data layer by layer;
- d2) obtaining another object route data with a layer number smaller than the object route data read when reading the object route data; and
- d3) generating and setting the pollution-blocking route data in the same layer of the object route data read when determining that a boundary of the printing slices corresponding to the object route data obtained exceeds a boundary of the printing slices corresponding to the object route data read.

3. The method of slicing and printing multi-colour 3D object of claim 2, wherein step d2 obtains the plurality of object route data, a difference between the layer number of each of the object route data obtained and the layer number of the object route data read is not larger than a checking layer number.

4. The method of slicing and printing multi-colour 3D object of claim 1, wherein step d) comprises a step d4) generating and setting the pollution-blocking route data in the same layer of and the object route data matching when any layer number of the object route data matching a setting layer number.

5. The method of slicing and printing multi-colour 3D object of claim 1, wherein step d comprises:
- d5) when determining that any one of the object route data needs to generate the pollution-blocking route data of the same layer generating a copy of the object route data and the copy being used as the pollution-blocking route data;
- d6) modifying the pollution-blocking route data to make the corresponding pollution-blocking printing slices surround and partially overlap the object printing slices of the same layer according to a predetermined spacing; and
- d7) modifying the pollution-blocking route data to make the corresponding pollution-blocking printing slices overlap the edge of the object printing slices at an interval of at least the predetermined distance according to a predetermined distance.

6. The method of slicing and printing multi-colour 3D object of claim 1, wherein step d is generating the pollution-blocking route data of the same layer and setting the pollution-blocking route data to make the pollution-blocking printing slices overlap an outer edge of the object printing slices according to the object image of the same layer when determining that any one of the object printing slices needs to be colored.

7. The method of slicing and printing multi-colour 3D object of claim 1, wherein step d is generating the pollution-blocking route data of the same layer and setting the pollution-blocking route data to make the pollution-blocking printing slices overlap an inner edge of the object printing slices when determining that the multi-colour 3D object is an open shell and determining that any one of the object printing slices needs to be colored according to the object image of the same layer.

8. The method of slicing and printing multi-colour 3D object of claim 1, wherein the method further comprises a step f) after step d) and before step e), step f is generating a plurality of extending pollution-blocking route data of a plurality of extending pollution-blocking printing slices, and setting each of the extending pollution-blocking route data to make each of the extending pollution-blocking printing slices surround and partially overlap the pollution-blocking printing slices of the same layer, wherein each of the extending pollution-blocking route data respectively records the layer number.

9. The method of slicing and printing multi-colour 3D object of claim 8, wherein step f is setting each of the extending pollution-blocking route data to make each of the extending pollution-blocking printing slices overlap the pollution-blocking printing slices at an interval of at least a predetermined distance.

10. The method of slicing and printing multi-colour 3D object of claim 1, wherein step e is executing a scrap back pumping, then printing same-layer the pollution-blocking printing slices when the object printing slices have been printed.

* * * * *